United States Patent [19]

Lunka et al.

[11] Patent Number: 5,004,393
[45] Date of Patent: Apr. 2, 1991

[54] AUTOLOADER MAGAZINE FOR TAPE CARTRIDGES AND METHOD THEREFOR

[75] Inventors: Harold A. Lunka, Broomfield; Christian P. Marlowe, Nederland, both of Colo.

[73] Assignee: Storage Technology Corporation, Louisville, Colo.

[21] Appl. No.: 414,704

[22] Filed: Sep. 29, 1989

[51] Int. Cl.$^5$ .............................................. B65G 1/00
[52] U.S. Cl. ..................................... 414/331; 414/416
[58] Field of Search ............... 414/416, 417, 225, 222, 414/932, 331; 360/92

[56] References Cited

U.S. PATENT DOCUMENTS

| | | | |
|---|---|---|---|
| 3,111,585 | 11/1963 | Sano et al. | 414/416 X |
| 4,367,915 | 1/1983 | Georges | 414/331 X |
| 4,758,127 | 7/1988 | Imai et al. | 414/416 X |
| 4,824,310 | 4/1989 | Kosmowski et al. | 414/331 X |
| 4,860,133 | 8/1989 | Baranski | 360/92 |
| 4,871,290 | 10/1989 | Kaczynski et al. | 414/331 |

Primary Examiner—H. Grant Skaggs
Assistant Examiner—Keith L. Dixon
Attorney, Agent, or Firm—Dorr, Carson, Sloan & Peterson

[57] ABSTRACT

The present invention is a magazine for retaining a plurality of magnetic cartridges (3480 style) for loading into a tape drive autoloader. The magazine comprises a series of cartridge slots having integral spring detents to retain the cartridges in the magazine. Integral gear racks are formed on the rear wall of the magazine to enable the autoloader to manipulate the magazine either sequentially or for random access to the cartridges. Horizontal slots are formed on the side wall of each cartridge slot so that the autoloader can directly engage the cartridges for loading into a tape drive. The magazine is formed of a one-piece molded plastic body having inherent lubrication properties.

27 Claims, 4 Drawing Sheets

Fig. 2

AUTOLOADER MAGAZINE FOR TAPE CARTRIDGES AND METHOD THEREFOR

FIELD OF THE INVENTION

The present invention relates to a magazine for loading a plurality of magnetic tape cartridges into an autoloader for loading the cartridges into and out of an appropriate tape drive.

STATEMENT OF THE PROBLEM

Current practice for loading cartridges into a tape drive from storage generally involves one of three methods; an expensive library system using a robot, an operator manually loading an autoloader or an operator manually loading individual cartridges directly into the tape drive. The present invention pertains to the second method of using an autoloader.

The use of a cartridge library system with a robot is expensive and, therefore, it is limited by size and cost to large computer sites. One advantage of the robot method is its ability to select any one of the cartridges in the library regardless of the order in which the cartridges are stacked. In contrast, manual loading of individual cartridges under the third method is expensive due to labor costs and the increased probability of damage to the cartridge through dropping or other mishandling by the operator.

Most usage of tape drives under the second method require manual loading of the cartridges in a loose stack which feed into an autoloader in only one direction. This also requires the presence of the operator at the machine to load the next cartridge. The transfer of data to the cartridges is slowed if the operator is not there to insure that the cartridges are in place and in the proper order to be loaded into the tape drive.

The present methods require the operator to reassemble a particular stack of cartridges every time it is necessary to repeat a system job, taking care not to alter the sequence of the cartridges to be read by the tape drive.

The autoloaders presently used are able to access the cartridges only in the sequence the cartridges are loaded. The autoloader is unable to selectively access a particular cartridge from the stack of cartridges since the cartridges are moved in one direction only.

A need exists for an autoloader that minimizes operator labor costs and permits selective access to the stacked cartridges.

SOLUTION TO THE PROBLEM

The current invention solves this and other problems by providing a magazine to facilitate the handling and loading of a plurality of cartridges into an autoloader. The magazine of the present invention keeps a stack of cartridges together as a unit, thereby keeping a stream of data conveniently together. The compact size of the magazine enables it to be easily handled.

The relative low cost of the magazine enables an operator to maintain a plurality of magazines preloaded with either blank cartridges or cartridges already having data relating to a particular system job stored thereon ready and on hand for use.

The magazine of the present invention utilizes a plurality of storage slots having detents to retain the cartridges in the magazine. The loaded magazine can be turned over and the cartridges will not fall out of the magazine thereby minimizing damage from spillage.

Once the magazine is inserted into the autoloader, the operator's presence is no longer required. The magazine is designed to be vertically driven by the autoloader up or down to enable the autoloader to access the cartridges in any sequence desired.

The magazine is further designed to allow direct mechanical access from the autoloader to the cartridges while the cartridges are retained in the magazine rather than by manual or friction feeding of the cartridges into the tape drive as in the past devices.

The material used in the magazine exhibits the property of inherent lubricity which permits the use of the magazine surfaces as bearing surfaces.

These solutions and other features of the invention will be illustrated by the following descriptions in conjunction with the drawings.

SUMMARY OF THE INVENTION

The magazine of the current invention is a one-piece structure formed of a molded plastic material. The magazine is a rectangular box-shaped structure with side walls and a rear wall. The front wall is open to receive the cartridges. Cartridge receiving slots are formed in the front wall of the magazine by a series of horizontal shelves vertically spaced apart by approximately the thickness of a magnetic tape cartridge.

An integral detent is formed in each cartridge receiving slot to prevent the loaded cartridge from accidentally falling out of the magazine. The integral detents are cantilever springs formed out of a side wall of each cartridge receiving slot. The detents have a knob portion on the free end of the spring which engage a notch on the magnetic tape cartridge being loaded in a particular slot. The mechanical withdrawing means of the autoloader is able to disengage the cartridge from the detent in order to load the cartridge from the magazine into the autoloader.

Narrow access slots are horizontally formed opening into each cartridge slot through one of the sidewalls of the magazine. The access slots enable the autoloader to directly engage a cartridge contained in a cartridge slot by mechanical means on the autoloader to withdraw the cartridge from the magazine and load it into the tape drive.

The magazine is formed with individual viewing windows in the rear wall of each slot. This allows the operator to read the labels on each cartridge to verify the contents of each slot.

Two vertical gear racks are integrally formed in the rear wall of the magazine. The racks are engaged by a pinion gear drive on the autoloader which move the magazine vertically up and down. This enables the magazine to sequentially feed the cartridges in the order the cartridges were loaded or, if the autoloader system has the capability, to raise and lower the magazine as necessary to selectively access the cartridges.

The material used in the construction of the magazine exhibits the property of inherent lubricity. This permits the use of the magazine surfaces as bearing surfaces thereby reducing the friction and drag not only in maneuvering cartridges in and out of the slots, but also in the movement of the magazine within the autoloader and the racks meshing with the vertical drive of the autoloader. This contributes to the decreased size, complexity, and cost of the entire magazine/autoloader system.

These and other features of the claimed invention will be obvious from the following description of the preferred embodiment in conjunction with the drawings.

DETAILED DESCRIPTION OF THE INVENTION

Figure 1:
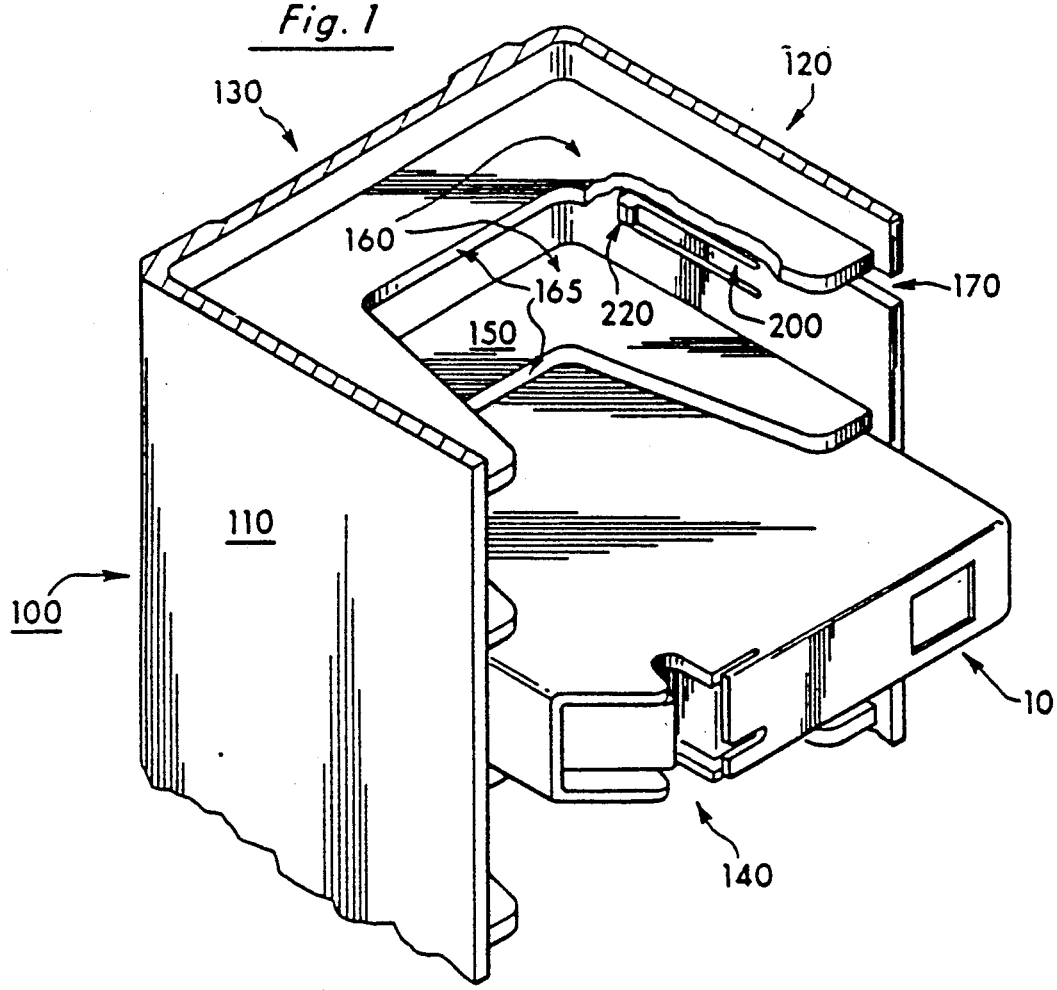
FIG. 1 is a partial perspective view of the front of the magazine with a tape cartridge loaded in a receiving slot.

The preferred embodiment of the current invention is illustrated in FIG. 1. The magazine is a one-piece structure having a rectangular box-shaped body 100 formed of a molded plastic material, such as polycarbonate. The body comprises a left side wall 110, a right side wall 120 and a rear wall 130. The front wall 140 of the body 100 is open to receive the cartridges 10. In the preferred embodiment, the cartridges 10 are 3480-style 18 track, parallel, ½ inch, 37 871 cpi magnetic tape cartridges, conforming to the document Text X3B/88-044 published by the American National Standards Institute. It is to be expressly understood that the present invention finds application with other sized and styled tape cartridges and that the present invention is not limited to 3480-style cartridges.

1. Cartridge Loading and Unloading

Figure 2:
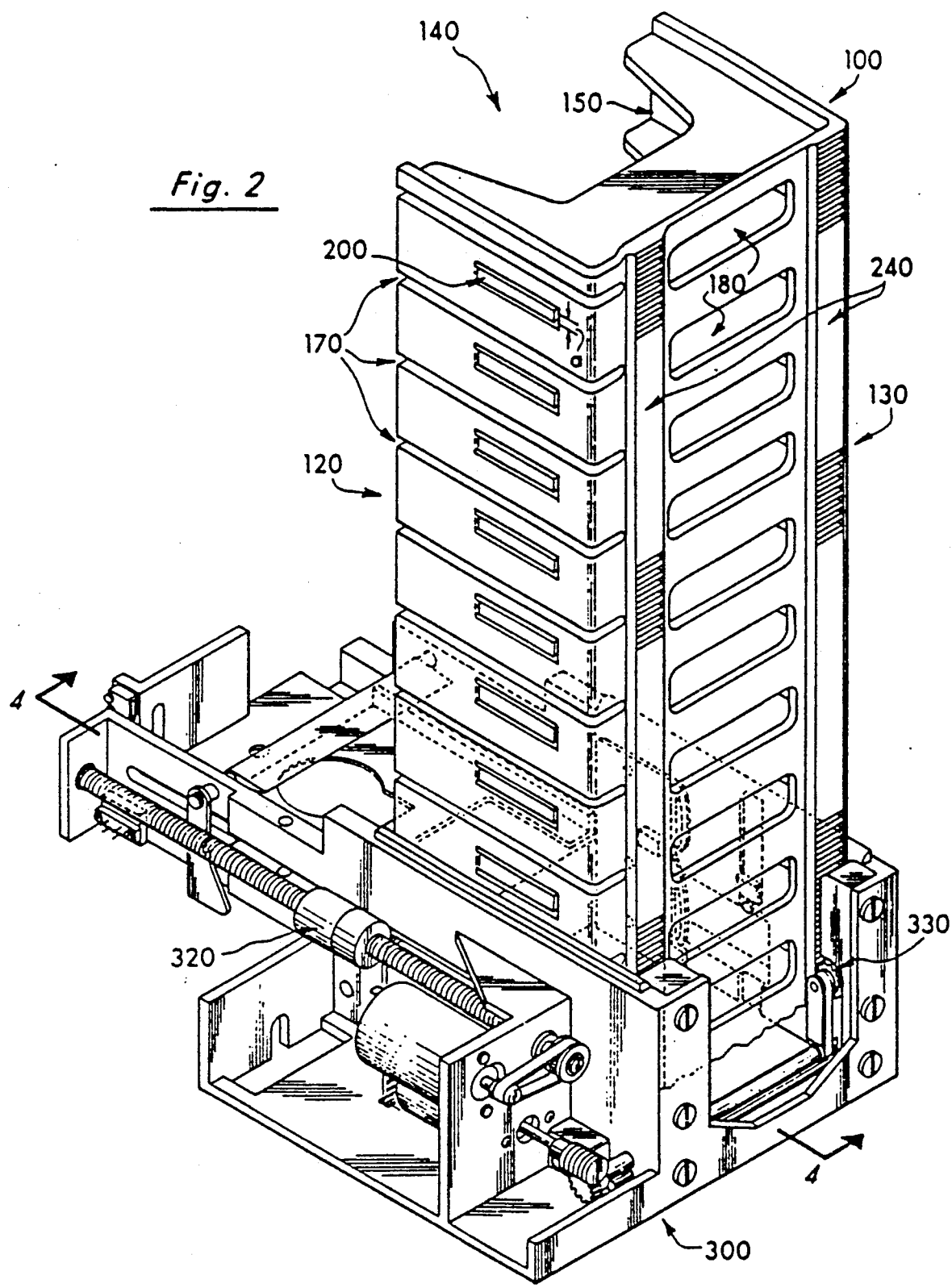
FIG. 2 is a rear perspective view of the magazine loaded into an autoloader.

Cartridge slots 150, as shown in FIG. 1, are formed in the magazine body 100 by a series of horizontal shelves 160 opening into the front face 140 to receive the cartridges 10. The shelves 160 are vertically spaced apart slightly more than the thickness of a cartridge 10 to allow adequate clearance of the cartridges into and out of the slots 150. Each shelf has a rearwardly directed and centrally oriented trapezoidal notch 165 formed therein in order to reduce the overall weight of the magazine. The trapezoidal notches 165 also enable the operator to easily pull the cartridges retained therein manually out of the slots 150. Each cartridge slot 150 is adapted to receive and retain a cartridge 10 in a horizontal orientation when the magazine 100 is inserted into the autoloader 300 in an upright position as shown in FIG. 2. The magazine of the preferred embodiment comprises ten cartridge receiving slots.

The claimed invention is not meant to be limited to the description of the preferred embodiment but includes variations within the range and scope of the inventive concept. For instance, the size and shape of the magazine body could vary, the size, shape and number of slots could differ or a different material could be used in the fabrication of the magazine.

As shown in FIGS. 1 and 2, each cartridge slot 150 is provided with a drive access slot 170 formed horizontally in the right side wall 120 of the magazine body 100. The drive access slot 170 is typically 0.150 inches wide and extends the entire width of the side wall 120 and partially into the rear wall 130 to a depth of typically 0.550 inches. The drive access slot 170 allows direct access to the cartridge 10 retained in the cartridge slot 150 by an engagement mechanism 320 of an autoloader 300.

Figure 4:
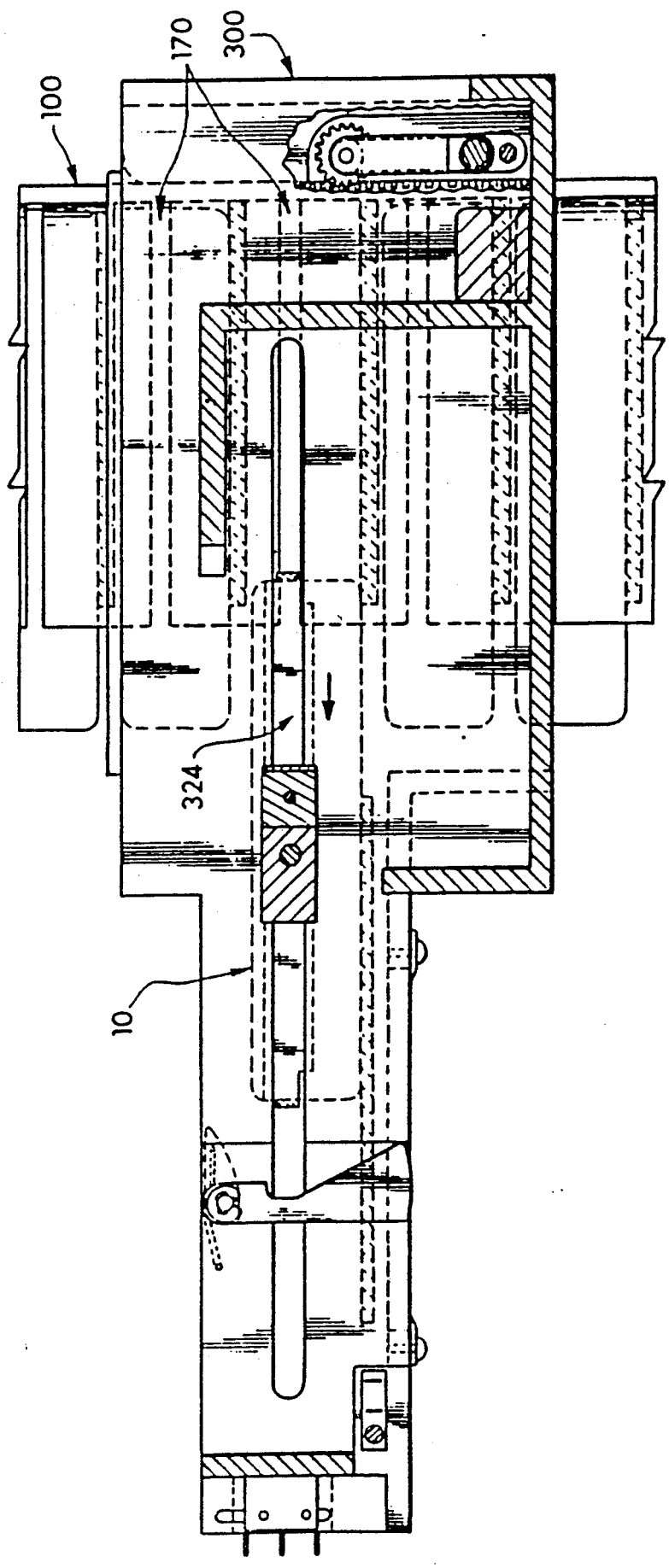
FIG. 4 is a detailed view along line 4—4 of FIG. 2 showing a cartridge engaged by the autoloader engagement mechanism.
Figure 5:
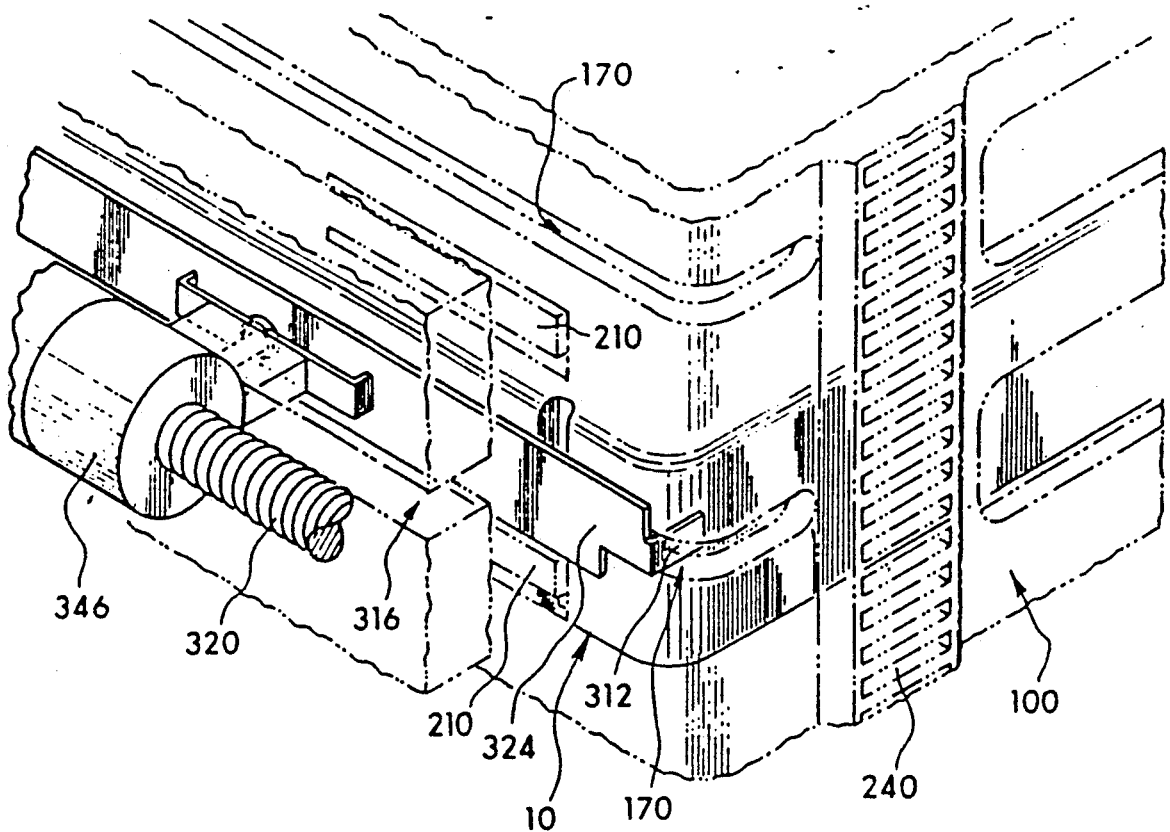
FIG. 5 is a perspective view of the engagement mechanism of the autoloader engaging a tape cartridge through the access slot of the magazine.

While the present invention does not relate to the design of the autoloader (shown in FIG. 3) the autoloader illustrated includes a pinion gear drive 330 which engages the rear racks 240 of the magazine 100 as will be discussed below and a cartridge engagement mechanism 320 to deliver the cartridge 10 from the magazine to the hub of the tape drive unit. The cartridge engagement mechanism 320 as shown in FIGS. 4 and 5, includes a caliper 324 having prongs 312 and 314 shown in FIG. 3 extending at right angles to the caliper at each end of the caliper to engage the cartridge through the access slot 170 of the magazine. The caliper is then driven longitudinally towards the rear of the autoloader, thus moving the cartridge 10 along with it and out of the cartridge slot 150.

2. Viewing Window

A rectangular viewing window 180 is formed in the rear wall 130 of each cartridge slot 150 as shown in FIG. 2. The label of a cartridge 10 retained in a slot 150 will be visible through the window 180 of that cartridge slot. This provides one important feature since it enables an operator to verify the identity of the cartridges 10 retained in each cartridge slot 150 without the need to withdraw the cartridges 10 from the magazine.

3. Safety Detent

Figure 3:
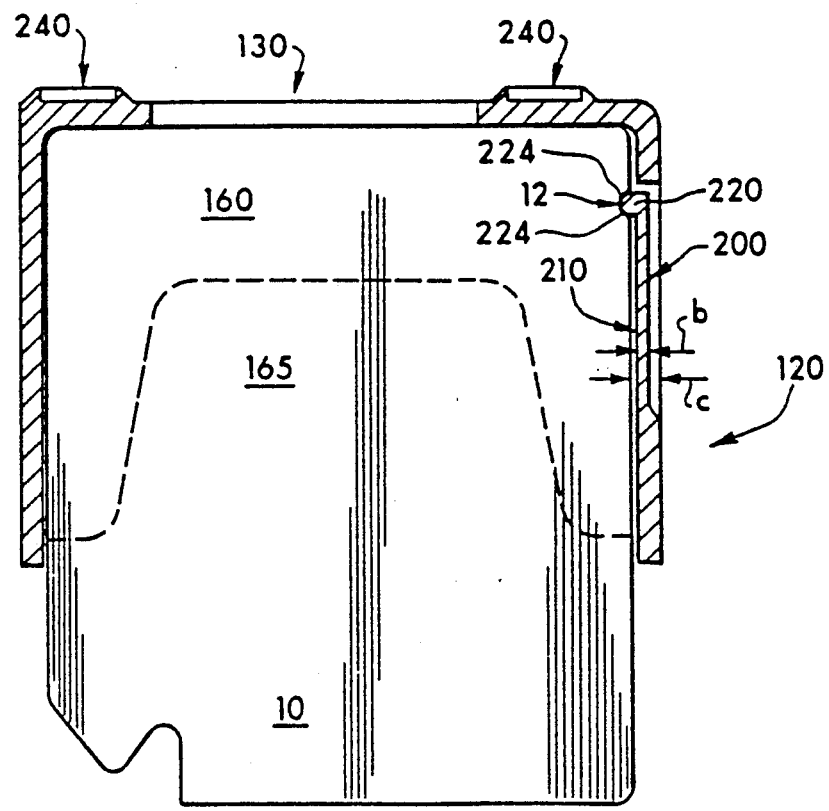
FIG. 3 is a top view of the magazine showing a cartridge in a cartridge receiving slot engaged by a detent.

As shown in FIGS. 2, 3 and 6, each cartridge slot 150 also comprises a safety detent 200 to prevent the cartridges from accidentally falling out of the magazine. Each detent 200 is integrally formed in the right side wall 120 of the magazine. As illustrated in FIGS. 2 and 3, each detent 200 includes a cantilever spring 210 having a reduced height, "a", in the side wall 120 of the slots (see FIG. 2) and a thinner cross-section dimension, "b", than the thickness of the side wall 120, "c" (see FIG. 3). This creates a resiliency in the detents 200 with respect to the side wall 120. The detents 200 are formed with a knob portion 220 on the free end of the cantilever spring 210 as seen in FIG. 3. The knob portion 220 further includes beveled edges 224 to assist in engaging and disengaging a notch 12 in the cartridge 10.

Figures 6A, 6B, 6C:
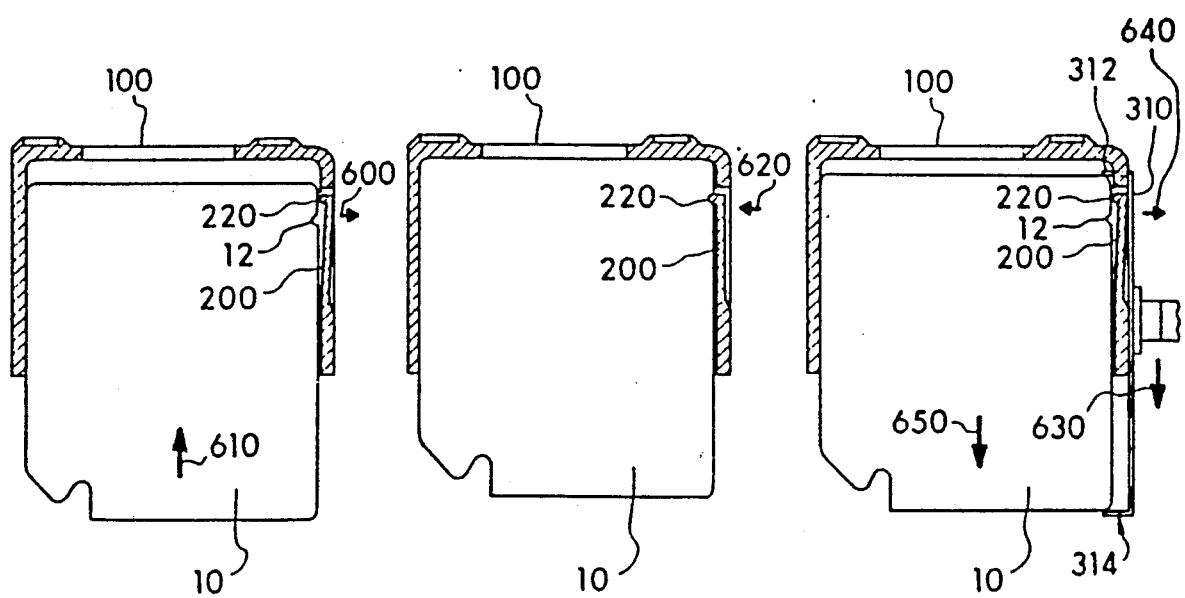
FIG. 6 is a view of the detent preparing to engage a tape cartridge; engaging the tape cartridge; and disengaging from the tape cartridge.

As shown in FIG. 6(A), the detent springs away 600 from the cartridge 10 as the cartridge is being inserted in the direction of arrow 610. When the cartridge is fully inserted, FIG. 6(B), the knob portion 220 engages the notch 12 on the cartridge 10. The cartridge 10 is thus restrained from falling out of the cartridge receiving slot 150 even when the magazine is turned face down. The direct engagement mechanism 320 of the autoloader 300 as discussed above, as shown in FIG. 6(C), provides sufficient force 630 to cause the detent 200 to disengage 640 from the notch 12 of the cartridge when the cartridge is being moved from the magazine in the direction of the arrow 650 as shown in FIG. 6(C) into the autoloader. The operator can also easily remove the cartridge from the magazine by simply pulling the cartridge from its slot 150. The detent 200 will spring out engagement with the notch, as shown in FIG. 6(C), allowing the cartridge to be removed.

4. Selection of Cartridge

As illustrated in FIG. 2, the magazine body 100 of the preferred embodiment includes two parallel and vertical gear racks 240 integrally formed on opposing sides of the rear wall 130 of the body extending the full height of the rear wall. The racks 240 are engaged by drive means, such as a pinion gear drive 330 on the autoloader 300, when the magazine is inserted into the autoloader 300 as shown in FIG. 2. This enables the autoloader 300 to manipulate the magazine vertically to move the cartridges 10 to the unloading stage of the autoloader 300. The cartridges 10 can be unloaded in the sequence they were loaded in the magazine or, if the autoloader 300 has the capability, such as being able to sense the labels of the cartridges through the viewing windows 180 or by other means, the magazine can be moved vertically up and down to selectively access a particular cartridge as desired.

The claimed invention is not meant to be limited to the description of the preferred embodiment but encompasses variations and modifications within the scope of the inventive concept. For instance, the means to manipulate the magazine may be by a different number or orientation of racks or the use of other types of drive mechanisms.

5. Operation

In use, the magazine 100 is loaded with cartridges 10 in a desired sequence by an operator. The operator inserts a cartridge 10 in each slot 150 until the notch 12 on the cartridge is engaged by a safety detent 200 as shown in FIG. 6(C). Once the magazine is loaded with the cartridges, then it can be transferred as a unit, thus keeping the stream of data intact. The magazine 100 is then inserted into an autoloader 300 such as the one illustrated in FIGS. 2 and 4. The magazine 100 is inserted in an upright position until the racks 240 are engaged by the magazine drive means 330 on the autoloader 300. At this point, the presence of the operator is no longer necessary. The autoloader 300 is activated to either drive the magazine 100 vertically downward to unload the cartridges in their loaded sequence or, if the autoloader has the capability, to manipulate the magazine up or down to selectively access a particular cartridge as the system may require.

Once an appropriate cartridge slot 150 is in the unloading position in the autoloader, the autoloader 300 can remove the cartridge 10 from its slot 150 as shown in FIG. 5. The drive access slot 170 allows the autoloader 300 to directly engage the cartridge 10 by the caliper 324 with the rear in directed prong 312 as shown in FIG. 5 and 6(C) rather than friction means as in past devices. This assures positive feeding of the cartridge 10 into the tape device without slippage or abuse of the cartridge. The direct mechanical engagement also provides sufficient force to disengage the cartridge 10 from the safety detent 200 as shown in FIG. 6(C). The mechanical engagement means 320 is able to engage the rear of the cartridge through the slot 170 extending into the rear wall 130 of the magazine and drive the cartridge into position in the tape drive (not shown). The cartridge 10 can be inserted back into its respective slot 150 by the front inwardly directed prong 314 pushing the cartridge 10 into the slot 150 until the safety detent 200 again engages the notch 12 of the cartridge. The magazine can then be moved to the next location until the next appropriate slot 150 and its respective cartridge 10 is in position. After all the tapes have been used or the system job is completed, the magazine is removed and a new magazine may be inserted.

The relatively low cost of the magazines enables the operator to pre-load and store a variety of magazines with tape cartridges so that when a desired configuration of tapes is needed, the operator will be able to simply load the appropriate magazine in the autoloader without worry of altering the sequence of data retained in the cartridges.

6. Physical Configuration

The magazine body 100 is formed from a material such as polycarbonate, which exhibits the property of inherent lubricity. The surfaces of the magazine body are excellent bearing surfaces, thereby reducing friction and drag on the cartridges as they slide in the shelves 160, on the side walls 110, 120 moving against the autoloader 300 and with the racks 240 engaging the magazine drive means 330. The use of this material eliminates the need for additional bearings or lubricating means. Thus the overall size, complexity and cost of the magazine is reduced.

The magazine is designed to be relatively compact and lightweight. In the preferred embodiment, the overall dimensions of a magazine having slots for ten cartridges are approximately 3.80 inches wide, 4.6 inches deep and 11.80 inches tall. Other variations of the magazine include a magazine capable of holding five cartridges and a magazine capable of holding fifteen cartridges. The magazine design can easily be altered to other dimensions, shapes or materials as necessitated by the particulars of an autoloader or cartridge requirements.

The claimed invention is not meant to be limited to the description of the preferred embodiment but encompasses other modifications and alterations within the range and scope of the inventive concept.

I claim:

1. A magazine for holding a plurality of magnetic tape cartridges to be loaded in an autoloader, said magazine comprising a rectangular box-shaped body having an open front wall, a rear wall and two side walls, said body comprising a plurality of vertically-spaced horizontal shelves forming cartridges receiving slots opening into said front wall for insertion of said cartridges, said body further comprising means to retain said cartridges in said cartridge receiving slots after said insertion, means to vertically drive said magazine in said autoloader to a selected tape cartridge, means to release said retention means from said selected cartridge, and means in each of said cartridge receiving slots to allow direct access from the engagement means of said autoloader to said cartridges retained in said cartridge receiving slots wherein said access means comprise a horizontal slot formed across the full length of one of said side walls in each of said cartridge receiving slots in said body.

2. The magazine in claim 1 wherein said retaining means comprise a detent in each of said cartridge receiving slots.

3. The magazine in claim 2 wherein said detent comprises an integral cantilever spring formed in one of said side walls in each of said cartridge receiving slots, said cantilever spring comprising a knob portion formed on the free end of said spring to engage a notch on said cartridge inserted in said cartridge receiving slot.

4. The magazine of claim 1 wherein said magazine drive means comprise a vertical gear rack integrally formed on said rear wall of said body.

5. The magazine of claim 4 wherein said magazine drive means further comprise a plurality of spaced apart vertical gear racks integrally formed on said rear wall of said body.

6. The magazine of claim 1 wherein said horizontal slot further comprises said horizontal slot extending partially into said rear wall of said body.

7. The magazine of claim 1 wherein said magazine body further comprises individual viewing windows in said rear wall of each of said cartridge receiving slots.

8. The magazine of claim 1 wherein said magazine body is formed of a molded plastic material having inherent lubrication properties.

9. The magazine of claim 1 wherein said magnetic tape cartridges comprise eighteen track, parallel, one-half inch 3480-type magnetic tape cartridges.

10. A magazine for holding a plurality of magnetic tape cartridges to be loaded in an autoloader, said magazine comprising a one-piece rectangular box-shaped body having an open front wall, a rear wall and two side walls, said body formed of a molded plastic material having inherent lubrication properties, said body further comprising a plurality of vertically-spaced horizontal shelves forming slots opening into said front wall for insertion of said cartridges, individual viewing windows formed in said rear wall of each of said cartridge receiving slots, horizontal slots formed across the full length of one of said side walls in each of said cartridge receiving slots to allow direct access from cartridge withdrawing means on said autoloader to said cartridges retained in said cartridge receiving slots, detents formed in each of said cartridge receiving slots to retain said cartridges in each of said cartridge receiving slots, said detents integrally formed in one of said side walls of each of said cartridge receiving slots, and a vertical gear rack integrally formed on said rear wall of said body wherein said magazine can be vertically driven to a selected cartridge by a magazine drive means on said autoloader engaging said gear rack.

11. The magazine of claim 10 wherein said shelves comprise a rearwardly directed and centrally oriented trapezoidal notch formed in each of said shelves.

12. The magazine of claim 10 wherein said direct access slots further extend partially into said rear wall.

13. The magazine of claim 10 wherein said detents comprise integral cantilever springs having a knob portion on the free end of said spring to engage a notch of said cartridge retained in said cartridge receiving slot.

14. The magazine of claim 10 wherein said vertical gear rack further comprises a plurality of spaced vertical gear racks.

15. The magazine of claim 10 wherein said magnetic tape cartridges comprise eighteen track, parallel, one-half inch 3480-type magnetic tape cartridges.

16. A magazine for holding a plurality of 18 track, parallel, one-half inch wide 3480-type magnetic tape cartridges to be loaded into an autoloader, said magazine comprising a rectangular box-shaped body having an open front wall, a rear wall and two side walls; said body comprising:

a plurality of vertically spaced shelves forming slots opening into said front wall for insertion of said cartridges;

a horizontal slot formed across the full length of one of said side walls in each of said cartridge receiving slots so engagement means on said autoloader can remove a cartridge retained in said cartridge receiving slots from said magazine;

an integral cantilever spring formed on one said side walls in each of said slots to releasably detain a cartridge inserted in each of said slots, said spring having a knob portion formed on the free end of said spring which engages a notch formed on said cartridge to releasably detain said cartridge in said slot; and means on said body to allow said magazine to be vertically moved relative to said autoloader.

17. The magazine of claim 16 wherein said means to allow said magazine to be moved comprises a vertical gear rack integrally formed on said rear wall of said magazine body.

18. The magazine of claim 16 wherein said means to allow said magazine to be moved comprises two parallel vertical gear racks integrally formed on said rear wall of said magazine body.

19. The magazine of claim 16 wherein said body further comprises individual viewing windows formed in said rear wall of each of said cartridge receiving slots for viewing labels on said cartridges.

20. The magazine of claim 16 wherein said horizontal slots extend partially into said rear wall of said body so said engagement means can engage the rear of said cartridges retained in said cartridge receiving slots.

21. The magazine of claim 16 wherein said body is formed of a molded plastic material having inherent lubrication properties.

22. A magazine for holding a plurality of 18 track, parallel, one-half inch wide 3480-type magnetic tape cartridges to be loaded into an autoloader for a mainframe computer, said magazine comprising a rectangular box-shaped body having an open front wall, a rear wall and two side walls; said body comprising:

a plurality of vertically spaced shelves forming slots opening into said front wall for insertion of said cartridges;

a horizontal slot formed across the full length of one of said side walls in each of said cartridge receiving slots so engagement means on said autoloader can remove a cartridge retained in said cartridge receiving slots from said magazine; and means on said body to allow said magazine to be vertically moved relative to said autoloader.

23. The magazine of claim 22 wherein said means to allow said magazine to be moved comprises a vertical gear rack integrally formed on said rear wall of said magazine body.

24. The magazine of claim 22 wherein said means to allow said magazine to be moved comprises two parallel vertical gear racks integrally formed on said rear wall of said magazine body.

25. The magazine of claim 22 wherein said body further comprises individual viewing windows formed in said rear wall of each of said cartridge receiving slots for viewing labels on said cartridges.

26. The magazine of claim 22 wherein said horizontal slots further comprise said horizontal slots extending partially into said rear wall of said body so said engagement means can engage the rear of said cartridge retained in said cartridge receiving slots.

27. The magazine of claim 22 wherein said body is formed of a molded plastic material having inherent lubrication properties.

* * * * *